Nov. 27, 1945.   W. T. MOORE   2,389,631
AUTOMATIC AND SEMIAUTOMATIC CARBINE
Filed Sept. 6, 1941   5 Sheets-Sheet 1
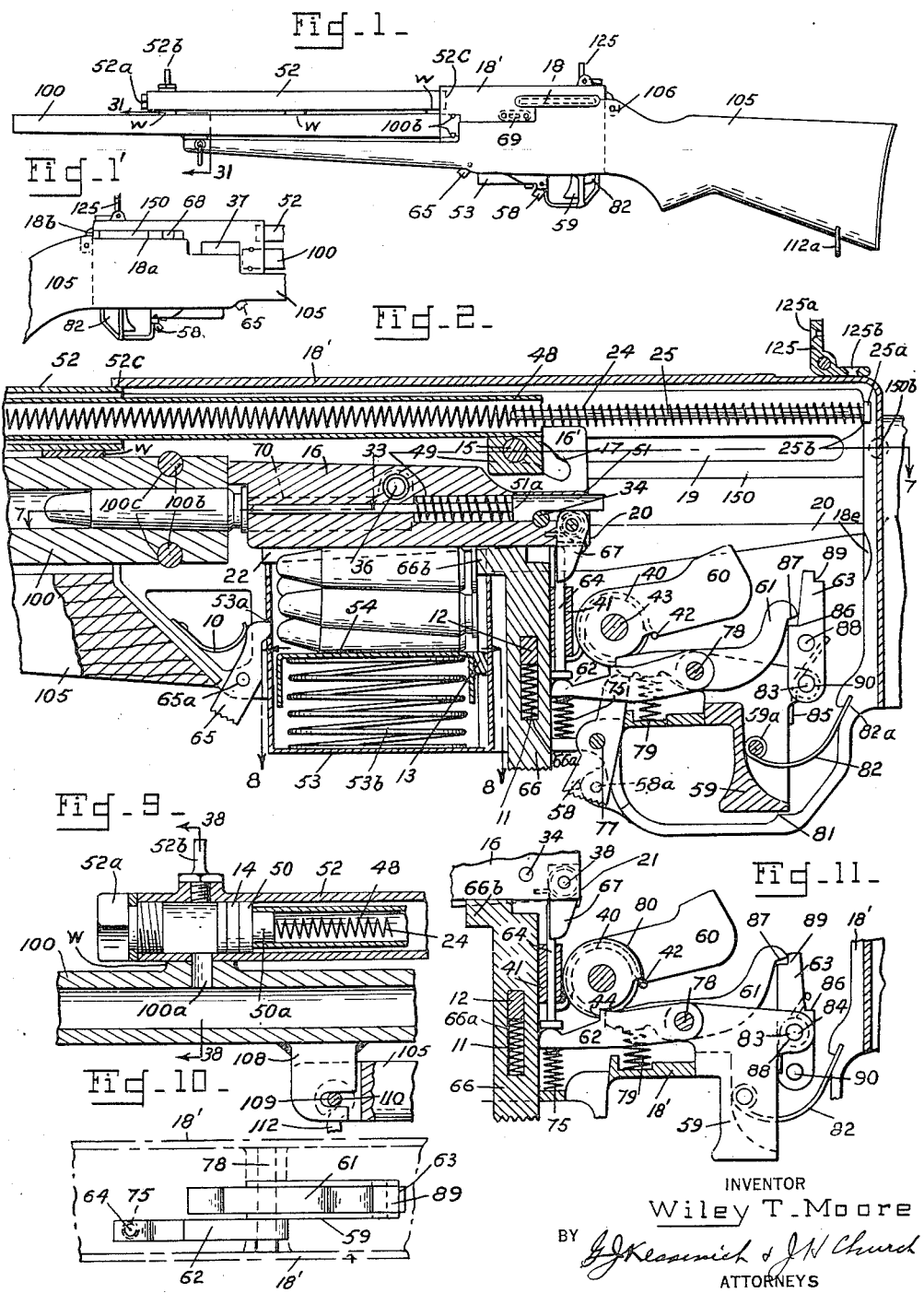
INVENTOR
Wiley T. Moore

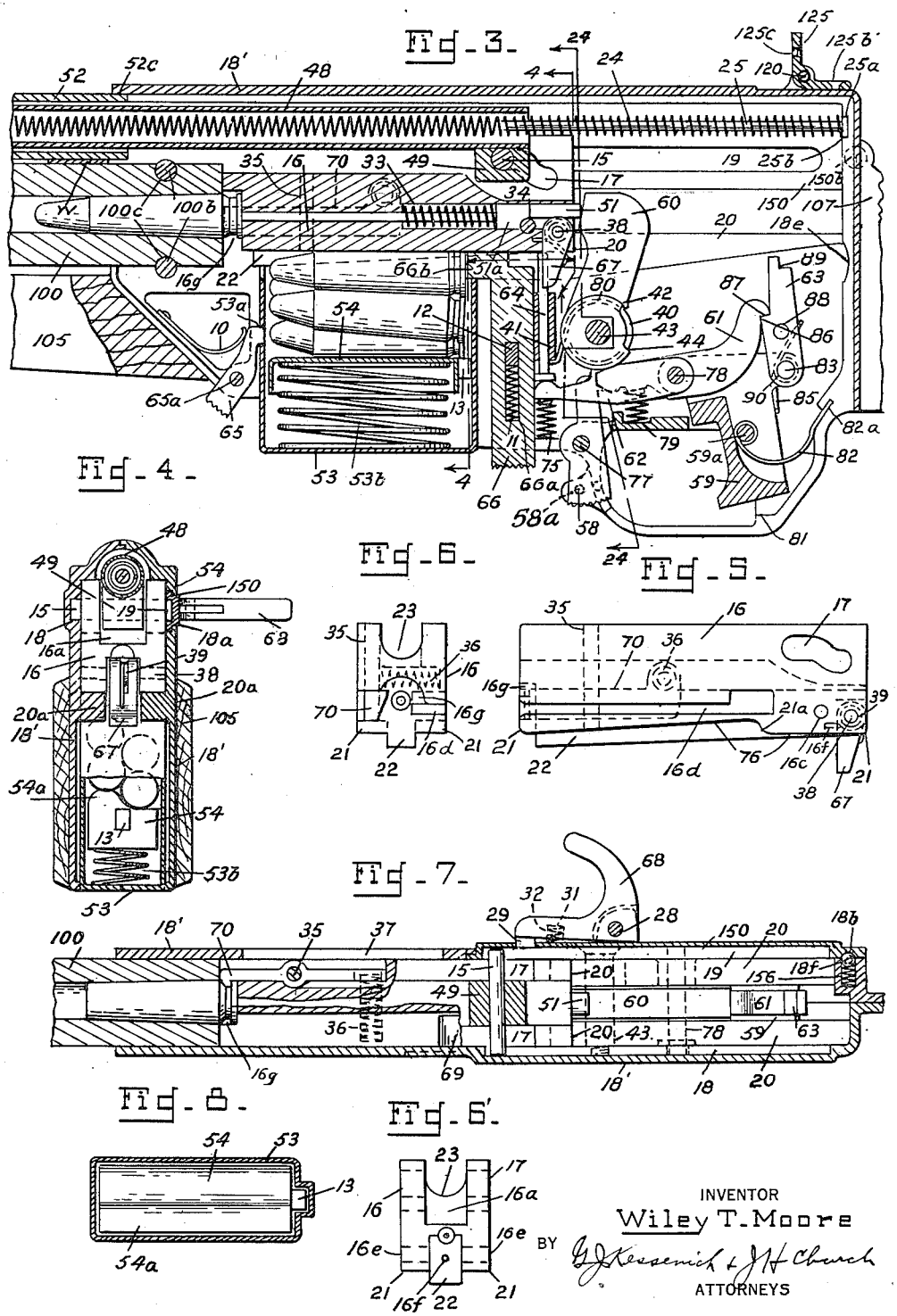

Nov. 27, 1945.   W. T. MOORE   2,389,631
AUTOMATIC AND SEMIAUTOMATIC CARBINE
Filed Sept. 6, 1941   5 Sheets-Sheet 3
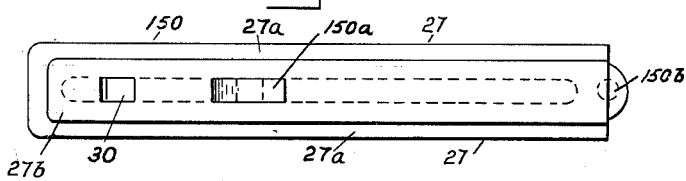
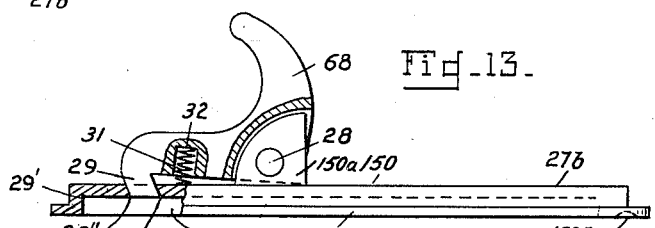
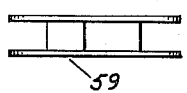
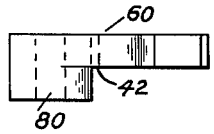
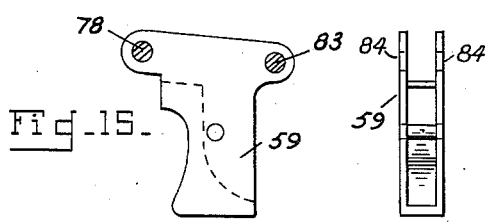
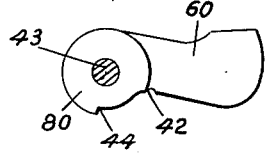
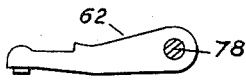
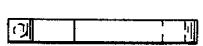
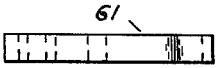
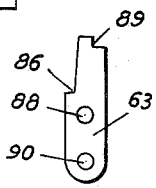
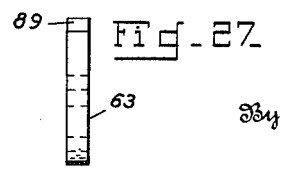
Inventor
Wiley T. Moore
By
Attorneys Nov. 27, 1945. W. T. MOORE 2,389,631
AUTOMATIC AND SEMIAUTOMATIC CARBINE
Filed Sept. 6, 1941 5 Sheets-Sheet 4
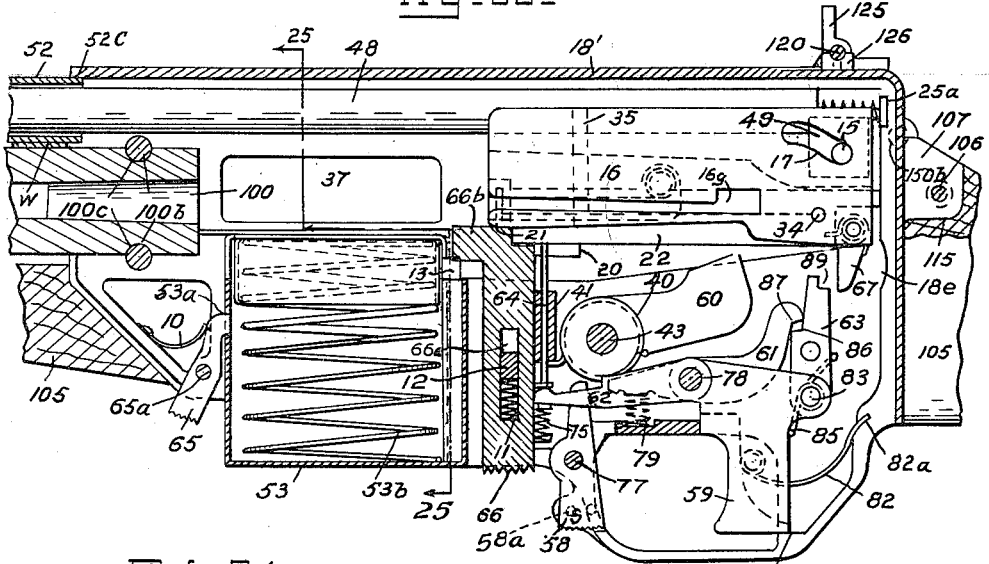
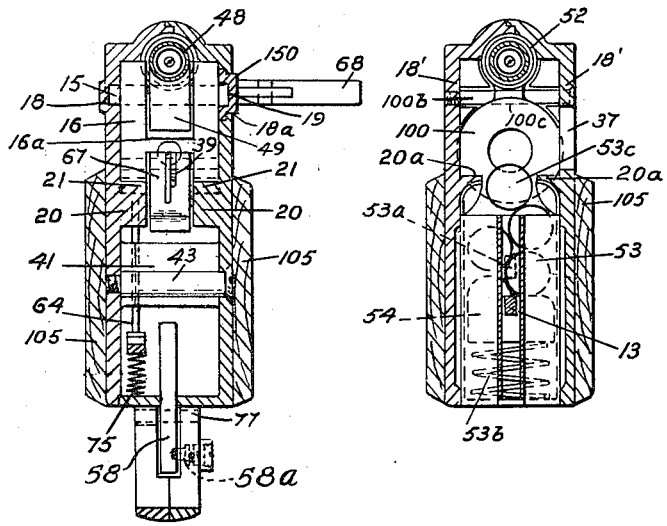
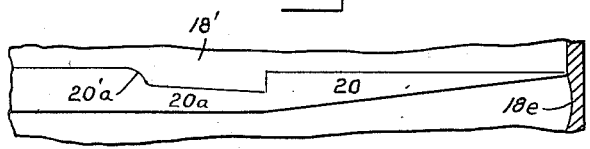
Inventor
Wiley T. Moore Nov. 27, 1945.  W. T. MOORE  2,389,631
AUTOMATIC AND SEMIAUTOMATIC CARBINE
Filed Sept. 6, 1941  5 Sheets-Sheet 5
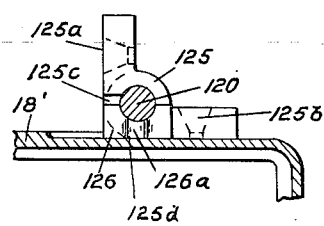
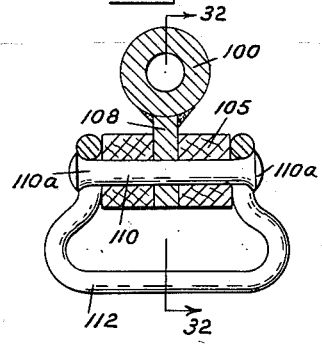
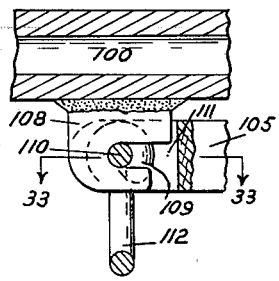
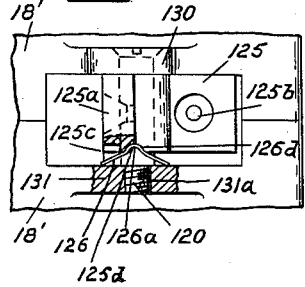
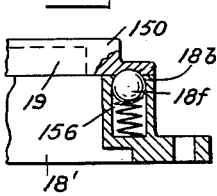
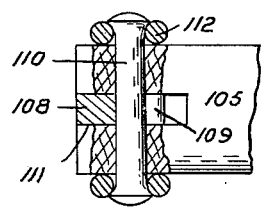
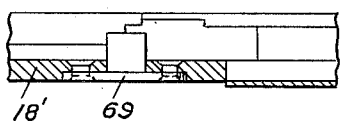
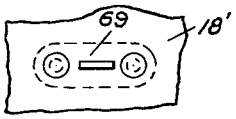
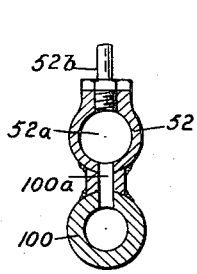
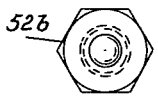
Inventor
Wiley T. Moore
By Kessenich + J H Church
Attorneys Patented Nov. 27, 1945

2,389,631

UNITED STATES PATENT OFFICE 2,389,631

AUTOMATIC AND SEMIAUTOMATIC CARBINE

Wiley T. Moore, United States Army, Laverne, Okla.

Application September 6, 1941, Serial No. 409,771

6 Claims. (Cl. 42—3)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a firearm which may be made automatic or semi-automatic in operation.

An object of this invention is to provide a firearm which may be set for automatic or semi-automatic operation in the field or workshop and which may not be readily reset by the operating personnel.

Another object of this invention is to provide a firearm which requires a dismantling of the firearm in order to convert it from automatic operation to semi-automatic operation or vice versa.

Another object of this invention is to provide a locking mechanism which causes the firearm to be automatic or semi-automatic depending upon the manner in which one of the sears is assembled.

Another object of this invention is to provide a firearm and parts and arrangement of parts therefor so that the firearm may be made automatic or semi-automatic in operation, and which may be made small and compact so that it might be employed by mounted or parachute troops.

Another object of this invention is to provide a carbine which may have the desirable characteristics of a pistol whereby the carbine may be substituted for the pistol.

Another object of this invention is to provide an improved bolt operated hammer releasing mechanism in which the bolt is raised and moved in breech opening position by the actuation of a piston in an auxiliary gas pressure chamber.

Another object of this invention is to provide a firearm with a barrel which might be readily disassembled from the firearm and replaced.

Another object of this invention is to provide an improved sight for a firearm.

Another object of this invention is to provide a firearm which may be readily disassembled and assembled.

The nature and further objects of this invention will appear from the description in the following specification and accompanying drawings wherein:

Fig. 1 is a view of the left side of the gun.

Fig. 1' is a view of the right side of the gun.

Fig. 2 is a sectional view through the gun disclosing the arrangement of locking elements when the hammer is in the cocked position and the gun is assembled for semi-automatic firing; the safety latch 58 is shown in the safety position.

Fig. 3 is a sectional view through the gun disclosing the arrangement of locking elements when the hammer is in firing pin striking position and the gun is assembled for semi-automatic firing.

Fig. 4 is a view taken on the line 4—4 in Fig. 3.

Fig. 5 is a side view of the bolt with the cocking cam 67 in place.

Fig. 6 is an end view taken of the forward end of the bolt.

Fig. 6' is an end view taken on the rearmost end of the bolt.

Fig. 7 is a view taken substantially on the line 7—7 of Fig. 2.

Fig. 8 is a view of the ammunition clip taken on the line 8—8 of Fig. 2.

Fig. 9 is a sectional view taken near the forward end of the gun barrel disclosing the communication between the gun barrel and the auxiliary pressure chamber.

Fig. 10 discloses a plan view of the arrangement of the trigger 59, automatic sear 62, automatic sear release 64, semi-automatic sear 61 and semi-automatic sear release 63.

Fig. 11 discloses the arrangement of sear elements when the gun is adapted for automatic fire.

Fig. 12 discloses a plan view of the bolt slide with its operating handle removed.

Fig. 13 discloses a side view of the bolt slide with its operating handle in place.

Fig. 14 discloses a top view of the trigger.

Fig. 15 discloses a side view of the trigger with pins 78 and 83 in place.

Fig. 16 discloses an end view of the trigger.

Fig. 17 discloses a plan view of the hammer.

Fig. 18 discloses a side view of the hammer.

Fig. 19 discloses a side view of the automatic sear with the pin 78 in place.

Fig. 20 discloses a plan view of the automatic sear.

Fig. 21 discloses a side view of the semi-automatic sear with the pin 78 in place.

Fig. 22 discloses a plan view of the semi-automatic sear.

Fig. 23 is a sectional view through the gun disclosing the arrangement of locking elements when the bolt is held in the furthermost rear position by bolt lock 66 and the firearm is adapted to fire semi-automatic.

Fig. 24 discloses a view taken substantially along line 24—24 in Fig. 3.

Fig. 25 discloses a view taken substantially along line 25—25 in Fig. 23 but the clip is shown with ammunition therein.

Figs. 26 and 27 disclose the sear release 63 in side and end elevation respectively.

Fig. 28 discloses the extractor 70 in side elevation.

Fig. 29 discloses the rear sight assembly in side elevation.

Fig. 30 discloses a plan view of the rear sight assembly.

Fig. 31 discloses a view of the connection between the stock and the barrel taken substantially on the line 31—31 in Fig. 1.

Fig. 32 discloses a view taken substantially on line 32—32 in Fig. 31.

Fig. 33 discloses a view taken substantially on line 33—33 in Fig. 32.

Fig. 34 discloses an enlarged view of the spring biased means for holding the bolt slide 150 in its normal inoperative position.

Fig. 35 is an end view in elevation of the ejector 69.

Fig. 36 is a plan view of the ejector 69.

Fig. 37 is a plan view of the front sight 52b.

Fig. 38 is a section taken on the line 38—38 of Fig. 9.

Fig. 39 is a condensed view showing the outline of the combination guide and abutment forming members 20, 20a on the receiver.

This invention resides in the novel arrangement and combination of elements necessary to produce a firearm of the type hereinafter described and claimed, it being understood that changes in the precise embodiment of the invention herein disclosed may be made within the scope of what is claimed without departing from the spirit of the invention.

*Semi-automatic operation*

The ammunition to the gun is fed from a clip 53 containing two rows of ammunition and the spring biased clip follower 54 which has a projection 54a so as to cause single rounds of ammunition to be fed into the breech of the gun through the opening 53c (Fig. 25) in the clip 53. The clip 53 is held in place by the clip release lever 65 which is biased by the spring 10 on the receiver and pivotable on pin 65a in the receiver 18' so that the lever 65 extends within an aperture 53a of the clip 53 as indicated in Fig. 2.

A flat bolt lock 66 has a rectangular aperture 66a (Fig. 3) within which is disposed the compression spring 11 and a fixed rectangular projection 12 on the receiver (Figs. 2, 3 and 23).

When the clip 53 is devoid of ammunition (Fig. 23), the lug 13 on clip follower 54 abuts the upper projection 66b (Figs. 2 and 3) on bolt lock 66 and raises the bolt lock due to the action of the clip follower spring 53b against the action of the weaker spring 11 so that the bolt projection 22, in its rearmost position, is held in the rectangular insert in the upper right hand corner of bolt lock 66. The bolt may be released from the position shown in Fig. 23 by pulling down on bolt lock 66 whereby projection 66b is drawn out of engagement with the bolt projection 22.

The bolt is actuated automatically by a gas piston 50 (Fig. 9) or manually by a handle 68 (Figs. 1' and 13). The gas piston 50 which has packing material 14 disposed in a groove therein is adapted to slide in the gas cylinder 52. An operating rod tube 48 is fastened to the cylindrical portion 50a of piston 50 and moves therewith. The lug member 49, (Figs. 2, 3 and 4), is welded or brazed to the operating tube 48 and is adapted to lie within a groove 16a (Figs. 4 and 6') in the bolt 16. A pin 15 (Fig. 4) extends through the tube operating rod lug 49, through two aligned cut-out portions 17 in the bolt 16, (Figs. 2, 5 and 6'), and the ends of the pin 15 ride in guides 18 and 19. The guides 18 and 19 are straight and cause the pin 15 to have a straight-line motion. Guide 18 is in the form of a recess in the left hand half of the receiver 18' whereas guide 19 is in the form of a recess in the bolt slide 150, (Fig. 13).

The bolt 16, when in closed position, is prevented from moving backwards due to the direct action of the ammunition powder gases upon the bolt because two adjacently disposed abutments 20, (Figs. 2, 3 and 24), formed integral with the receiver coact with the end portions 21 (Figs. 6' and 24) on the bolt; the bolt 16 is raised from behind the abutments 20 and moved backwards due to the pressure action of the ammunition powder gases upon the piston 50 (Fig. 9). The bolt 16 is raised from behind abutments 20 by the camming action between the pin 15 and the edges of the apertures 17 on the bolt.

The downward extending projection 22 (Figs. 5 and 22) on the bolt serves to strip single rounds of ammunition from the ammunition clip 53 and is guided by the spaced members 20 (Fig. 24) and 20a (Figs. 4 and 25) as the bolt moves. The upper portion of the bolt has substantially a semi-elliptical groove 23 (Fig. 6) within which the operating rod tube 48 is disposed. Practically no rotary motion is imparted to the bolt during its travel because of the arrangements described in this paragraph. The bolt slides on the upper surface of the spaced members 20 and 20a as the bolt is actuated. It is noted that the sliding surfaces on bolt portions 21—21 each have a reentrant portion forward of the curved surface 21a (Fig. 5) which defines a locking lug adapted to fittingly engage a recess 20'a (Fig. 39) in the receiver portions 20a when the bolt is in its closed position; this causes the bolt to be more securely locked and also is advantageous in the design of a compact firearm.

The gas operated piston 50 is biased by the coil compression spring 24 which is partially encased by the operating rod tube 48. The follower spring rod 25 having a head 25a which is adapted to fit in the recess 25b in the receiver serves to hold the spring 24 in the center of tube 48. The spring 24 actually extends from the spring rod head 25a to the projection 50a (Fig. 9) on the piston 50.

The slot 19 (Figs. 4 and 13) in which an end of the pin 15 is adapted to slide is a longitudinal recess in the bolt slide 150 (Fig. 13). The bolt slide 150 is adapted to be mounted on the right hand receiver with the flanges 27 on the inside of the receiver and with the surfaces 27a of the flanges (Fig. 12), in slidable engagement with the inner surface of the receiver. The receiver has a longitudinal slot 18a (Figs. 4 and 24) on its right hand side through which the raised portion 27b of the bolt slide 150 projects and in which the movement of the raised portion is guided. The bolt slide 150 when operated projects beyond the rearmost portion of the receiver because the slot 18a has an opening 18b (Fig. 1') at its rearmost portion; the rearward movement of the bolt slide 150 is limited however, due to the limited movement of pin 15 in the left hand receiver recess 18 which is closed at the rear of the receiver (Fig. 1), and for that reason the bolt slide 150 may not be withdrawn entirely from the receiver when the right hand half of the latter is assembled to the left hand half.

The gas cylinder 52 is closed at its forward end by a plug 52a (Fig. 9) which is readily removable for cleaning purposes. The front sight 52b consists essentially of a screw threaded plug which is screwable in the gas cylinder 52 and has a projecting cylindrical portion (Figs. 9 and 37) which is adapted to be aligned with the rear sight when the firearm is fired. The plug hole for the sight 52b is in line with the conduit 100a which places the gas cylinder 52 in communication with the barrel 100 so that with the front sight 52b removed a straight cleaning rod (not shown) may be readily shoved through the tapped hole for the front sight so as to project into and clean the conduit 100a. With the plug 52a and front sight 52b removed access is readily had to the portions of the gas cylinder which should be cleaned.

The barrel 100 is welded to the gas cylinder 52 in the vicinity of the conduit 100a and also at the places indicated on Fig. 1 by the letter W so that the gas cylinder 52 is formed integral with the barrel 100. The gas cylinder 52 has its rearmost end 52c adapted to snugly fit into a circular opening in the receiver 18' so that the gas cylinder may be readily pulled out of the receiver 18'. The barrel 100 is held in the receiver 18' by two pins 100b which are held in opposite walls of the receiver 18' and have their body portion projecting into two oppositely disposed grooves 100c on the barrel circumference. In order to remove the barrel and the integrally formed gas cylinder 52 from the firearm proper it is necessary only to remove the two pins 100b out of engagement with the grooves 100c in the barrel and then grasp the barrel and pull it forward; the barrel and gas cylinder will slide out of cooperating apertures in the receiver 18' and the barrel will slide out of engagement with the stock 105 because of a slotted connection which is shown in detail in Figs. 9 and 31–33. It is thus apparent that upon removal of the pins 100b the barrel 100 may be readily removed for replacement by another barrel without disassembling the working parts within the receiver. The gas piston 50 (Fig. 9) is retained on the firearm because the gas cylinder tube 48 (Fig. 2) is fastened to the bolt by means of the pin 15. In order to replace the barrel, the piston 50 is guided by hand into its cylinder 52 and then the barrel is shoved backwards so that the barrel and gas cylinder enter their cooperating holes in the receiver and the slotted extension on the barrel engages the pin 110 which passes through the stock; the two barrel holding pins 100b are then inserted in holding position in the receiver 18'.

A handle 68 is pivotally mounted on the bolt slide about the pin 28 (Fig. 13). In order to manually operate the bolt to open position it is only necessary to pull back on the handle 68 for then the inner surface 29' of the bolt slide 150 engages the right hand end of pin 15 (Fig. 4), on the tube operating rod lug 49 and the pin 15 then follows the motion of the bolt slide. When firing automatically or semi-automatically the right hand end of pin 15 freely moves in the bolt slide recess 19 and the left hand end of pin 15 freely moves in the recess 18 (Figs. 1, 3 and 4). The handle 68 has a projection 29 which is insertable through an aperture 30 in the bolt slide so that the projection might be projected into the bolt slide recess 19 and form an abutment for the pin 15. The lug 29 is normally biased out of the bolt slide recess by the spring 31 which is held in a recess 32 in the handle 68. In normal operation the bolt is biased to its closed position by the coil compression spring 24 (Fig. 2) but if for some reason, other than that due to lack of rounds in the magazine clip, the bolt fails to close under the spring action of spring 24 then the operator presses down on handle 68 and shoves the bolt slide to its forward position; in so doing the left hand edge 29'' of projection 29, Fig. 13, is adapted to engage the pin 15 and thus cause the bolt to be moved with the bolt slide. The handle 68 has a hollow portion into which the projection 150a is free to move and is held therein by pin 28 passing through the handle walls which define the hollow portion. The bolt slide recess 19 extends almost the entire length of the bolt slide as shown in Fig. 12. When the firearm is fired, due to the motion of the gas piston 50, there is no motion imparted to the bolt slide 150 because the recess 19 in the bolt slide provides sufficient clearance for the motion of the pin 15. A detent 150b in the bolt slide has a spring biased ball 18f insertable therein (Figs. 7 and 34) when the bolt slide is in its forward position; this holds the bolt slide in its closed position. Ball 18f is held by lips 18b on the recess 156 on the receiver 18' so that a portion of the ball 18f projects beyond the confines of the receiver.

The firing pin 51 is centrally disposed within the bolt and normally held out of engagement with the inserted round of ammunition by the action of compression spring 33, which biases the enlarged portion 51a of the firing pin. The firing pin is held in the bolt by pin 34 which abuts a curved section on the enlarged portion 51a of the firing pin and which is held in the bolt hole 16c.

The extractor 70 (Figs. 7 and 28) is pivoted about the pin 35 in the bolt and is biased by a compression spring 36 which is recessed in the bolt. The ejector 69 (Figs. 7, 35 and 36) is fastened to the receiver in the path of the extracted cartridge with the result that the cartridge is ejected out of the opening 37 on the right hand side of the receiver (Figs. 1' and 7). The bolt has a semi-cylindrical opening 16g in its forward end adapted to partially confine a portion of the cartridge and, also, a longitudinal slot 16d which is dimensioned so as to provide a clearance between the fixed ejector 69 and the movable bolt.

The pawl 67 is pivotable about the pin 38 which is inserted in the aligned bolt holes 16e (Fig. 6'). The centrally mounted spring 39 causes the pawl 67 to be held firmly against the bottom portion 22 of the bolt. One end of the spring 39 is inserted in the hole 16f (Fig. 6') in the bolt, is stressed, and the other end of the spring is adapted to abut the pawl (Fig. 4) so as to maintain the spring 39 in its stressed condition. The pawl 67 as shown in Fig. 3 is in its furthermost clockwise position; the pawl is displaced from this position upon striking the semi-automatic sear release 63 and the hammer 60 as the bolt is moved towards the bolt closing position from its rearmost position (Fig. 23). A recess 18e in the receiver allows clearance for the free end of the pawl as it rotates due to coaction with the sear release 63.

The hammer 60 is biased by a spring 40. One end of the spring 40 is disposed behind the fixed portion 41 (Fig. 23) on the receiver and the other end of the spring is disposed in the recess 42 in the hammer after the spring 40 is previously stressed by turning it about the round extension 80 on the hammer in a direction so that the hammer tends to rotate counterclockwise about the pin 43. The hammer may be held in cocked position by the semi-automatic firing sear 61 or by the automatic firing sear 62 cooperating with the flat abutment 44 on the hammer.

The sear release pin 64 slides through an aperture in the member 41 (Fig. 24) which is formed in two parts each integral with the receiver, and the pin 64 is moved in its axial direction as the bolt is raised and lowered over the abutments 20. The sear release pin 64 and sear 62 are biased by the compression spring 75 so that the tip of the pin is in constant engagement with the bottom faces 76 (Figs. 5 and 23) on the left side of the bolt.

The safety latch 58 which is pivoted about pin 77 on the receiver is adapted to fit under the semi-automatic sear 61 as shown in Fig. 2 so as to prevent the hammer from being rotated counterclockwise. As is well understood in the art a spring detent 58a best shown in Figs. 2, 3, 23 and 24 may be applied to the safety latch to releasably retain the latch in either the operating or the safety positions.

The semi-automatic firing sear 61 and the automatic firing sear 62 are both pivoted about the same fixed pin 78 which also serves to pivot the trigger 59. Sear 61 is biased by the compression spring 79. Sear 62 is biased by the compression spring 75. The sears 61 and 62 are both adapted to be moved below the round portion 80 on hammer 60 and as the hammer is rotated clockwise during the cocking operation initially the semi-automatic sear 61 falls behind the abutment 44 and then the automatic sear 62 falls behind the abutment so that immediately after the cocking operation the hammer 60 is held by the automatic firing sear 62 (Fig. 23); but as the bolt returns to its closed position by dropping behind abutment 20 the automatic firing sear 62 is depressed out of engagement with hammer 60 by the downward movement of pin 64 with the result that the hammer rotates counterclockwise until its abutment 44 engages the semi-automatic firing sear 61.

The trigger 59 is pivoted about the pin 78 in the receiver and is normally held against abutment 81 on the receiver by the spring 82. Spring 82 is of the leaf type and has one end insertable in a groove 82a in the receiver 18' and the other end encircling a pin 59a which is fastened to the trigger. The semi-automatic sear release 63 is pivoted on pin 83 which passes through hole 90 in the sear release. Pin 83 is held in the holes 84 (Fig. 16) in the trigger. Spring 85 encircles pin 83 and partially encircles the semi-automatic sear release 63 and trigger 59 so as to normally hold the sear release 63 in abutting relationship to sear 61. The sear 61 is depressed out of abutting relationship with abutment 44 on the hammer by "squeezing" the trigger since in doing so the sear 61 is pivoted counterclockwise by the release 63 which is carried on the trigger. There is enough "lost motion" between release 63 and sear 61, as seen in Fig. 2, to provide for "trigger squeeze."

It is necessary to release the trigger after each round of ammunition is fired in the semi-automatic firing arrangement; this is necessary so as to allow the projection 86 on release 63 to fall below the abutment 87 on sear 61 since the projection 87 is lowered due to the action of spring 79 when the release 63 is moved out of abutting relationship with sear 61 by the cocking cam 67 on the bolt.

The rear sight 125 allows an adjustment to two predetermined ranges; this is accomplished by bodily rotating the rear sight through ninety degrees. The rear sight 125 (Figs. 29 and 30) has two sighting apertures 125a and 125b which are disposed at different distances from the center of the pin 120 about which the sight 125 may be rotated and securely held in either one of its two positions by means of a spring 126 which has a protruding portion 126a (Fig. 30) insertable in grooves 125c and 125d in one side of the sight 125. The sight 125 is disposed between projection 130 on the right hand half of the receiver 18' and projection 131 on the left hand half of the receiver 18'. A countersunk pin 120 having screw threads engageable in a tapped hole 131a (Fig. 30) passes through a hole in the sight and holds the spring 126 in place. The spring 126 has a semi-circular opening on its upper edge through which the pin 120 passes and a straight line portion which abuts the top of the receiver thus preventing the spring from rotating when the sight is rotated in its adjustment operation. The spring 126 due to its resiliency and its protruding portion 126a which cooperates with grooves 125c and 125d in the sight holds the sight in a steady position. In order to change the range setting it is necessary only to flip the rear sight 125 ninety degrees.

Removal of stock and receiver cap

The stock 105 is made in one piece and has the shape substantially as indicated in Fig. 1. It is only necessary to remove the pin 106 which passes through the stock and a projection 107 (Fig. 23) on the receiver 18' in order to remove the stock from the firearm; the connection between the stock 105 and barrel 100 at the forward end of the firearm partakes of a slot and pin arrangement which requires no disassembly of elements in order to separate the stock from the barrel. The latter connection will now be described and reference will be had to Figs. 9 and 31–33. The barrel 100 has a projection 108 welded thereto which has a slot 109 into which a pin 110 passing through the stock 105 is free to move; a slot 111 (Fig. 33) in the forwardmost portion of the stock 105 is adapted to receive the projection 108. The pin 110 also serves to hold the front strap swivel 112 permanently in place since it surrounds the stock 105 (Fig. 31) and is held thereon by the enlarged portions 110a on the pin 110. The swivel 112 is formed from a round rod which has its ends formed in the shape of a ring and formed to accommodate a sling (not shown) between its ends. The other connection of the stock to the firearm is made in the following manner; the stock has a slot 115 (Fig. 23) into which a projection 107 on the receiver 18' fits and the pin 106 which passes through a hole in the projection is held by the walls of the stock which define the slot. The stock 105 fits snug to the receiver 18' as shown in Figs. 1 and 23; in order to remove the stock from the firearm the pin 106 is removed, the stock pivoted about the pin 110 in the forward end of the stock until the stock no longer touches the receiver, and then the stock is pulled to the rear to cause the pin 110 to be separated from the projection 108. The stock 105 has a rear sling swivel 112a fastened thereto.

The receiver 18' is made in two halves which fit together as indicated in Figs. 24 and 25. The member 41 (Fig. 24) is split as indicated by the full line so that the release pin may be removed. The left hand side of the receiver in the last mentioned figures is held in aligned position with respect to the right hand side by means of the following pins which hold the various firearm elements; these pins are fastened in the right hand side of the receiver and project into cooperating holes in the left hand side of the receiver: clip lever pin 65a, trigger and sear pin 78 (Fig. 10) and safety lock pin 77 (Fig. 24). Pin 106 is removed in the process of removing the stock 105 so that pin no longer serves to hold the two halves of the receiver in aligned position when the stock is removed. The following pins have a countersunk head engaging a countersunk portion on the right hand half of the receiver and screwable in a tapped portion on the left hand half of the receiver so that the two parts of the receiver do not fall apart when the encircling stock 105 is removed: hammer pin 43 (Fig. 24) and the two barrel holding pins 100b (Fig. 25). Also as mentioned previously the countersunk head rear sight pin 120 has screw threads which engage a tapped hole on the left hand side of the receiver (Fig. 30) and it would be necessary to unscrew that pin before the two halves of the receiver may be separated.

In recapitulation, in order to have access to the working parts within the receiver, the following pins must be removed in this order: (1) Pin 106 is removed so as to allow the removal of the stock 105, (2) Rear sight pin 120 (Fig. 30) is screwed out of engagement with the tapped hole in the left hand half of the receiver, (3) Hammer pin 43 and barrel holding pins 100b are disposed in the manner indicated by the pin 43 in Fig. 24 and are screwed out of engagement with corresponding tapped holes in the left hand half of the receiver, (4) The left hand half of the receiver may be then pulled out of abutting relationship with the right hand half of the receiver which has the pins 65a, 78 and 77 fixed therein and projecting therefrom into oversize holes in the left hand half of the receiver. The left hand half of the receiver is thus essentially a cap for closing the receiver proper.

*Automatic operation (Fig. 11)*

In order to convert the gun from semi-automatic to automatic operation it is necessary to partially dismantle the gun in the manner described above so as to have access to the semi-automatic sear release 63. After the dismantling operation the pin 83 and the semi-automatic sear release 63 are removed and reassembled so as to have the relative position shown in Fig. 11; i. e., the semi-automatic sear release 63 is turned around and the pin 83 is inserted through the other hole 88 in the sear release. In the automatic arrangement the abutment 89 on the sear release 63 is adapted to cooperate with the abutment 87 on the sear 61 in the same manner as abutment 86 on the sear release 63 cooperates with the abutment 87 on the sear in the semi-automatic arrangement. With this arrangement, however, the release 63 does not extend in the path of the pawl 67 with the result that so long as the trigger is "squeezed" the sear 61 is held out of engagement with the hammer and the hammer is tripped each time the bolt falls behind abutment 20.

I claim:
1. In a firearm, a receiver, a breech bolt reciprocable in a fore and aft direction in the receiver, a striker, a sear pivotally mounted in the receiver and constructed and arranged to engage the striker, a trigger pivotally mounted in the receiver, a release lever pivotally mounted on the trigger and constructed and arranged to engage the sear, a depending movably mounted pawl on the breech bolt constructed and arranged to disengage the release lever from the sear as the bolt reciprocates rearwardly, a stop on the pawl limiting movement thereof in one direction, and spring means imposing yielding restraint upon movement in the other direction whereby the pawl rides over the release lever as the bolt reciprocates forwardly.

2. In a firearm, a receiver, a striker mounted within the receiver, a sear pivotally mounted in the receiver and engageable with the striker, a trigger mounted in the receiver, a release lever spring biased into engagement with the sear, a breech bolt reciprocable in the receiver, mounting means for the release lever providing two alternative positions of pivotal engagement of the release lever with the trigger, and means on the breech bolt engageable with the release lever when the release lever is mounted in one position to rotate the release lever out of engagement with the sear as the bolt is reciprocated, the alternative position of the release lever being out of the line of travel of the last mentioned means whereby the release lever may remain in engagement with the sear.

3. In a firearm, a receiver, a breech bolt, a striker within the receiver, a sear constructed and arranged to engage the striker, a trigger mounted in the receiver, a pivot pin mounted in the trigger, a release lever, a pair of spaced mounting holes in the release lever, a step on one side of the release lever spaced from one of the mounting holes, a step on the other side of the release lever occupying the same spaced relation to the other mounting hole as does the first mentioned step in relation to its corresponding mounting hole, and spring means engaged between release lever and trigger to bias the release lever into engagement with the sear when either mounting hole is engaged on the pivot pin, the release lever being constructed and arranged to project into the path of the bolt for release from the sear when mounted in one mounting hole but not when mounted in the other of said holes.

4. In a firearm, a receiver, a breech bolt having a depending pawl thereon and reciprocally mounted in the receiver, a striker mounted in the receiver, a sear mounted in the receiver and constructed and arranged to engage the striker, a trigger mounted in the receiver, a pivot pin on the trigger, a release lever, upper and lower mounting holes in the release lever, a step on one side of the release lever spaced upwardly from the lower mounting hole, a step on the other side of the release lever spaced from the upper mounting hole by a distance equal to that between the lower hole and the first mentioned step, the release lever being constructed and arranged to be mounted on the trigger with either of the mounting holes engaging the pivot pin and spring means biasing the release lever toward engagement with the sear in both positions, the release lever projecting upwardly to be engaged by the depending pawl when mounted with the lower hole engaging the pivot pin, whereby the release lever will be disengaged from the sear by the pawl when the release lever is mounted with the lower mounting hole engaging the pivot pin and will not be so disengaged when mounted with the upper mounting hole engaging the pivot pin.

5. In a firearm, a receiver, a breech bolt mounted in the receiver for sliding rearwardly and forwardly therein, a slot in the receiver defining a track in substantial parallelism with the path of sliding movement of the breech bolt, a slidable member engaging the track and formed with a guide groove parallel to the track, a projecting member on the breech bolt received in slidable relation in the groove, means on the slidable member engageable with the projecting member to retract the breech bolt when the slidable member is retracted, an operating handle on the slidable member, an aperture in the slidable member communicating with the groove therein, and a lug on the operating handle projectable through the aperture into position to engage the projecting member on the breech mechanism when the slidable member is advanced.

6. In a firearm having a receiver, a track in the receiver, and a breech bolt reciprocable in the receiver, a projection on the breech bolt, a sliding member received in the track in the receiver and provided with a groove to slidably receive the projection, an aperture in the sliding member communicating with the grove, an operating handle movably mounted on the slidable member and a lug on the operating handle projectable through the aperture into the groove in position to engage the rear face of the projection on the breech bolt.

WILEY T. MOORE.